(12) United States Patent
van Oossanen (10) Patent No.: US 7,617,793 B2
(45) Date of Patent: Nov. 17, 2009

(54) VESSEL PROVIDED WITH A FOIL SITUATED BELOW THE WATERLINE

(75) Inventor: Pieter van Oossanen, Wageningen (NL)

(73) Assignee: Van Oossanen & Associates, Wageningen (NL)

( * ) Notice: Subject to any disclaimer, the term of this patent is extended or adjusted under 35 U.S.C. 154(b) by 137 days.

(21) Appl. No.: 11/494,675

(22) Filed: Jul. 28, 2006

(65) Prior Publication Data

US 2007/0017428 A1    Jan. 25, 2007

Related U.S. Application Data

(63) Continuation-in-part of application No. 10/525,755, filed as application No. PCT/NL03/00602 on Aug. 28, 2003, now abandoned.

(30) Foreign Application Priority Data

Aug. 28, 2002    (NL) .................................... 1021346

(51) Int. Cl.
 *B63B 1/26* (2006.01)
(52) U.S. Cl. .................................... 114/274
(58) Field of Classification Search ............... 114/274, 114/56.1, 61.26–61.32, 39.15, 39.24; 440/69, 440/66
 See application file for complete search history.

(56) References Cited

U.S. PATENT DOCUMENTS

| 1,356,300 | A | 10/1920 | McIntyre |
| 1,499,900 | A | 7/1924 | Zucker |
| 1,549,564 | A | 8/1925 | Slocum |
| 2,597,048 | A | 5/1952 | Almqvist et al. |
| 2,703,063 | A | 3/1955 | Gilruth |
| 2,767,678 | A | 10/1956 | Vertens |
| 2,832,304 | A | 4/1958 | Elyosius et al. |
| 2,858,788 | A | 11/1958 | Lyman |
| 3,006,307 | A | 10/1961 | Johnson |
| 2,991,747 | A | 11/1961 | Bader et al. |

(Continued)

FOREIGN PATENT DOCUMENTS

AU    21 982/67    11/1968

(Continued)

OTHER PUBLICATIONS

Dr. Peter Van Oossanen, The Development of the 12 Meter Class Yacht "Australia II," The Seventh Cheasapeake Sailing Yacht Symposium, 1985, pp. 81-101.

(Continued)

*Primary Examiner*—Ed Swinehart
(74) *Attorney, Agent, or Firm*—Finnegan, Henderson, Farabow, Garrett & Dunner, LLP (57) ABSTRACT

Vessel having a non-planing hull provided with an attached foil which is below the surface of the water and spaced from the hull. The foil is attached in proximity to the aft end of the vessel, and is oriented with a downward tilt relative to the horizontal to provide a lifting force with a force component in the forward direction. The foil can be located entirely behind the vessel, partly below the aft hull portion of the vessel, or entirely therebelow. In the latter case, the hull is preferably provided with a recess.

26 Claims, 7 Drawing Sheets

U.S. PATENT DOCUMENTS

| | | | |
|---|---|---|---|
| 3,237,582 A | | 3/1966 | Sturgeon et al. |
| 3,373,710 A | | 3/1968 | Steinberg |
| 3,377,975 A | | 4/1968 | Field |
| 3,505,968 A | | 4/1970 | Gorman |
| 3,693,570 A | | 9/1972 | Erlykin et al. |
| 4,058,076 A | | 11/1977 | Danahy |
| 4,193,366 A | | 3/1980 | Salminen |
| 4,915,048 A | | 4/1990 | Stanford |
| 5,448,963 A | * | 9/1995 | Gallington .................. 114/274 |
| 2002/0040673 A1 | | 4/2002 | Bieker |
| 2005/0145156 A1 | | 7/2005 | Chesney et al. |

FOREIGN PATENT DOCUMENTS

| | | |
|---|---|---|
| DE | 39 36 280 A1 | 5/1991 |
| FR | 1 541 693 | 10/1968 |
| JP | 62 008893 A | 1/1987 |
| JP | 62244779 A * | 10/1987 |
| JP | 11 180379 A | 7/1999 |
| JP | 2001-294196 | 10/2001 |
| JP | 2002-053093 | 2/2002 |
| WO | WO 03/064247 | 8/2003 |
| WO | WO 2004/020276 | 3/2004 |

OTHER PUBLICATIONS

Intern'l Search Report PCT/NL 03/00602, Oct. 12, 2003.
Walter Johnson, "Proceedings of the Fifteenth AIAA Symposium on the Aero/Hydronautics of Sailing", The Ancient Interface XV, vol. 31, pp. 87-94, 1985.

* cited by examiner

VESSEL PROVIDED WITH A FOIL SITUATED BELOW THE WATERLINE

This application is a continuation-in-part of prior application Ser. No. 10/525,755, filed Aug. 16, 2005 now abandoned, which was based on PCT Application No. NL 2003/000602, filed Aug. 28, 2003, which was based on Application No. NL 1021346 filed Aug. 28, 2002, all of which are hereby incorporated by reference.

BACKGROUND OF THE INVENTION

1. Field of the Invention

The present invention relates to a vessel with a single hull, the aft part of which has a smaller water displacement and less breadth lying in the water than the middle or central part, and provided with a foil extending below the waterline.

2. Description of the Related Art

Vessels having foils or vane-like members situated under the aft portion of the hull are known in the prior art. In particular, planing vessels are sometimes provided near the end with a foil or flap extending below the hull, in order to ensure that during planing the trim angle that the hull forms with the surface of the water is limited. Such planing vessels generally have a hull displacement that does not change substantially from the middle part in the aft direction.

An example of such a construction is found in U.S. Pat. Nos. 2,832,304; 4,915,048 and the Abstract of Japanese Patent Application 62008893. In these cases the foil is situated on the aft end of the vessel, and a vertical lift force is generated. Such vessels have no constriction of the submerged part of the vessel, in other words the cross-section of the submerged part of the vessel (perpendicular to the direction of movement of the vessel) does not decrease in the aft direction.

Furthermore, some catamarans are provided with fins for the purpose of reducing ship movement in waves. Such fins do not always have a foil profile. An example of the use of these fins in a boat is found in U.S. Pat. No. 3,208,422.

SUMMARY OF THE INVENTION

The present invention relates to a vessel having a non-planing hull such as a sailing boat or a motor-driven vessel. It can be a relatively small vessel such as a leisure vessel or a large vessel such as a tanker, container ship and the like. Such vessels are provided with a constriction, in other words the cross-sectional hull area below the waterline decreases in the longitudinal direction of the vessel, viewed in the aft direction. Such a reduction of the cross-sectional hull area is at least one-third to one-half relative to the location having the largest cross-sectional area of the submerged part of the vessel for medium-speed craft, and up to 100% in the case of typical merchant ships. In the case of some such vessels, the transom may not be submerged in the water, but may lie above the waterline. At the position of a constriction, the flow of the water during forward movement of the vessel will be directed upwards and/or inwards.

The terms length, breadth, waterline, etc. are used in this description. These terms are associated with the position of the vessel in the water. While it is being propelled in the usual direction, the direction of propulsion is the longitudinal direction in this case.

According to one aspect of the present invention, a foil is provided near the place where the greatest flow constriction occurs. The foil extends substantially transversely to each side of the vessel from the longitudinal axis of said vessel, lying at a distance below the hull over a breadth comprising at least half the breadth of said hull at the position of the greatest flow constriction of said vessel caused by said reduction in water displacement. This foil is arranged in such a way that, apart from an upward lifting force, a forward propulsion force is provided. This propulsion force manifests itself by faster travel in the same conditions or by reduced fuel consumption, or by both of these.

According to one advantageous embodiment of the invention, the distance from the foil to the hull is substantially constant over its full breadth. In such an embodiment, the foil follows the shape of the hull precisely at a distance that does not vary.

The foil preferably extends over the greatest possible part of the "breadth" of the hull. In practice, this means that in the normal vertical position of some vessels, the foil may extend until close to the waterline. It will be understood that this does not necessarily have to be the case in relatively broad vessels such as some types of merchant vessels, for example large oil tankers or container ships. The fact is that in these cases the breadth of the foil below the hull is already such that the part of it extending to the waterline would make only a small contribution to the effect described above. The breadth of the foil is, however, important in the case of smaller vessels such as sailing vessels.

Unlike the structure in the prior art, where a trim flap is used during planing and in that case may be movable between a position for planing and an ordinary sailing position, according to an advantageous embodiment of the invention, the foil according to the present invention can be arranged immovably on the hull, and the distance from and orientation in relation to the hull is invariable.

According to one advantageous embodiment of the invention, the length of the foil, in other words the size in the longitudinal direction of movement of the vessel, is at least 50% of the distance from the hull and is no more than 150% of said distance. In some embodiments the foil may be closer to the hull. The length of the profile decreases in the outward direction from the longitudinal axis of the vessel. The rear or trailing edge preferably tapers off to provide the length decrease.

In experiments it was found that the overall hydrodynamic resistance of a vessel can be reduced with the foil used above. It was also found that the stern wave of the vessel concerned is reduced, which results in a further reduction of the resistance. These effects are greater than the resistance (drag) encountered by movement of the foil through the water, so that a net positive result remains. Furthermore, it is possible to also limit the trim of a vessel with the foil.

From additional testing, it was found that foil performance could be further improved if the positioning and angular orientation of the foil be specified with respect to one or more of certain parameters such as the horizontal or the vessel waterline, and the hull shape and configuration, particularly the shape and configurations of the aft hull portion. While foil performance in respect to the present invention, in terms of providing a net forward propulsive force for a moving vessel, is dependant upon positioning of the foil in the local, upwardly directed flow field surrounding the hull aft portion, which may vary with particular hull design, speed, etc., the adherence to one or more of the above-mentioned foil positioning and angular orientation parameters can be useful as a step in optimizing performance.

Hence, in accordance with another aspect of the invention, the invention provides a vessel with a non-planing hull, of which the stern or aft portion has a smaller water displacement than the central portion of the hull, and which hull is provided with a foil attached at a distance thereto, which is below the surface of the water during operation, wherein said foil is attached in proximity to the aft end of the hull in such a way that the leading edge of the foil is at most half a chord length of the foil in front of the position where the aft end of the hull substantially leaves the water and said foil, as defined by its chord, is tilted downwards by its leading edge with respect to the horizontal.

As stated previously, the decrease in hydrodynamic resistance which is achieved is based on the fact that the foil, in the flow as exists below the aft-body of the vessel, develops a propelling force on the foil, and thus on the vessel, which is significantly larger than the drag of the foil itself. It should be understood that this theory in no way affects the scope of protection of the present patent.

It is of importance in realizing a propelling force on the foil to orient the foil at an angle with respect to the direction of the upward-sloping flow of the water below the rear part of the vessel. This orientation can be achieved, in general, by specifying the leading edge of the foil to have downward tilt angle (i.e., greater than zero degrees) with respect to the horizontal.

It should be noted that a foil is highly preferred to achieve the required lift force which is roughly perpendicular to the direction of the incident flow. One skilled in the art would understand that various foil profiles could be used, including the well-known NACA aerodynamic profiles as well as the German Eppler shapes (see e.g. "Theory of Wing Sections", by Ira H. Abbott and Albert E. von Doenhoff, Dover publications, Inc. New York, and "Airfoil Design and Data", by Richard Eppler, Springer-Verlag Berlin, ISBN 3-540-52505-X. A curved flat plate or other element may possibly be substituted for the foil to achieve a net forward thrust force, but such is not preferred due to inefficiencies resulting from the tendency of such elements to produce flow separation and resultant high drag for pitch angles between the plate and incident flow greater than about 1-2° that can occur, for instance, during normal operation due to changes in vessel speed. Hence "foil" as used herein should be interpreted to cover such curved plates or elements giving rise to such a lifting force.

Regarding the positioning of the foil relative to the hull, some ships have a flat transom stern. In the case of most ships with such a stern, the "position where the rear side of the hull substantially leaves the water" will, in general, be the longitudinal location of the bottom of the transom, if submerged or a point on the bottom of the adjacent aft hull portion if the transom is not submerged. In the case of a ship which at its aft end has a recess or which at its rear side is provided with sponsons or floats and where the hull leaves the water between the sponsons, the position where the hull substantially leaves the water will usually be the longitudinal location where the hull in the recess or between the sponsons leaves the water.

In summary, according to an aspect of the invention, at least half the chord of the foil is behind a vertical line through the location where the hull leaves the water.

In this application certain angles and dimensions have been defined in the following way:

The average angle of the buttock lines at the rear of the ship, $\alpha$, is the angle between the longitudinal tangent line to the aft-body of the hull below the water and the horizontal. Angle $\alpha$ also is referred to as the angle between the tangent to the vertical longitudinal cross-sections of the aft-body of the ship and the horizontal. In modern, conventional ships including merchant ships, this angle $\alpha$ will normally be between about 8° and 16°.

The angle of the tangent to the buttock lines at the rear of the vessel (or tangent to the vertical longitudinal cross-sections) at the longitudinal position of the leading edge of the foil, $\beta$, is the angle between the tangent to the hull below the water surface at the longitudinal position of the leading edge of the foil and the horizontal. In some embodiments of the invention, $\beta$ is about 11° to about 25°.

The angle of the chord of the foil with respect to the horizontal is referred to as $\gamma$. The chord of the foil is the (imaginary) line through the leading and the trailing edges of the foil. As used herein the "tilt" of the foil is determined by the angle $\gamma$.

The length of this chord preferably depends on the length of the vessel. According to a particular embodiment of the invention, the length of the foil is approximately between 2% and 10% of the length of the waterline of the ship operating at its normal draught.

In a preferred embodiment, the foil is mounted near the rear of the vessel in such a way, that a vertical (or perpendicular) line through the location where the rear or aft-part of the hull substantially leaves the water intersects the foil at less than or equal to about 0.5 times the length of the chord of that foil measured from its leading edge, or is in front of its leading edge.

In a further embodiment of the invention, the leading edge of the foil is tilted downwards with its chord at an angle $\gamma$ of between greater than 0° and about 22° with respect to the horizontal. The exact angle depends on the angle $\beta$. In general, when the angle $\beta$ is large, a larger downward tilt angle be chosen.

According to an embodiment of the invention especially suited for newly-built ships, the foil is located substantially entirely within the limits (vertical projection) of the vessel. In another embodiment, especially suited for attaching the foil to existing ships, the leading edge of the foil is located behind the aft end of the vessel.

In an embodiment which is especially suited for newly-built ships, the buttocks of the hull are configured with a greater upwards slope or inclination in front of or at the longitudinal position of the leading edge of the foil and the rearward-most part of the hull above the foil is located substantially above the water surface. In this embodiment, the greater steepness of the buttock lines preferably starts between about 0.5 and about 1.5 times the chord length of the foil in front of the longitudinal position of the leading edge of the foil.

In the variation in which the foil is located substantially entirely within the aft limits of the vessel, it is proposed, according to a particular variation of the invention, locally to provide the hull with a recess at the aft end. The length of a recess of this type is preferably from about 0.75 to about 1.50 times the length of the chord of the foil.

According to a further specification, the distance from the leading edge of the foil to the hull is greater than about 0.10 times, and preferably between about 0.25 to about 0.5 times, the chord length of the foil.

The foil may conceivably be fastened to the stern by any way. If the foil extends wholly or partly below the hull, it may be fastened to the rudder headbox, i.e. to the stationary portion of the rudder construction which extends below the hull. It may also be beneficial to attach (streamlined) struts in order further to support said foil.

According to an advantageous further embodiment of the invention, the foil for its largest part extends beyond the aft end of the vessel. This latter construction is particularly important if existing vessels have to be retrofitted with this fuel-saving construction. If the foil is entirely placed behind the aft part of the vessel, it is, in some cases, desirable to be able to rotate the support of the foil upward and to the front when entering a harbor. In that case the foil and a frame for attaching the foil can be rotatable or foldable onto the deck of the vessel.

However, in many retrofit cases, it will be necessary to provide a construction in which a portion of the foil extends below the vessel. In new constructions, preference is given to the former variation in which a recess is formed in the hull at the site of the foil where the hull rearward from a certain point extends above the water (i.e., rearward from the point where the hull substantially leaves the water).

In a further embodiment, the hull near the aft end of the vessel includes floats or sponsons on both sides of the hull, wherein the foil extends between both sponsons and below the surface of the water. The hull between the sponsons extends at least partially above the surface of the water. In an embodiment, the hull comprises a recess between the sponsons within the confines of the sponsons and located aft of the front side of the recess which is substantially above the surface of the water. In particular during service, at that location, the hull is above the surface of the water. The foil is, however, located below the surface of the water.

With the current invention, in which the aft portion of the hull above the foil is entirely or in part above the surface of the water, a propelling force is successfully realized via the foil, wherein the disadvantageous effect of the acting low pressure on the hull of the ship at that location is counteracted.

The shape of the foil is preferably adapted to the shape of the submerged portion of the ship at the site of the foil (in vertical projection). For large vessels, the span of the foil is generally smaller than the width of the portion of the ship below the waterline, i.e. the foil preferably does not extend past the submerged portion of the ship, although this is theoretically possible.

It is preferred that the angle of the chord of the foil is adjustable with respect to the water surface during service for realizing an optimal effect.

The invention relates, in particular, to vessels with non-planing hulls, i.e. to vessels preferably having a length of at least about 50 m. More particularly, the present invention relates to a vessel having a relatively low speed, for instance corresponding to a Froude number of less than about 0.5.

BRIEF DESCRIPTION OF THE DRAWINGS

The invention will be explained in greater detail below with reference to exemplary embodiments illustrated in the drawings, in which.

DETAILED DESCRIPTION OF EMBODIMENTS

Figure 1:
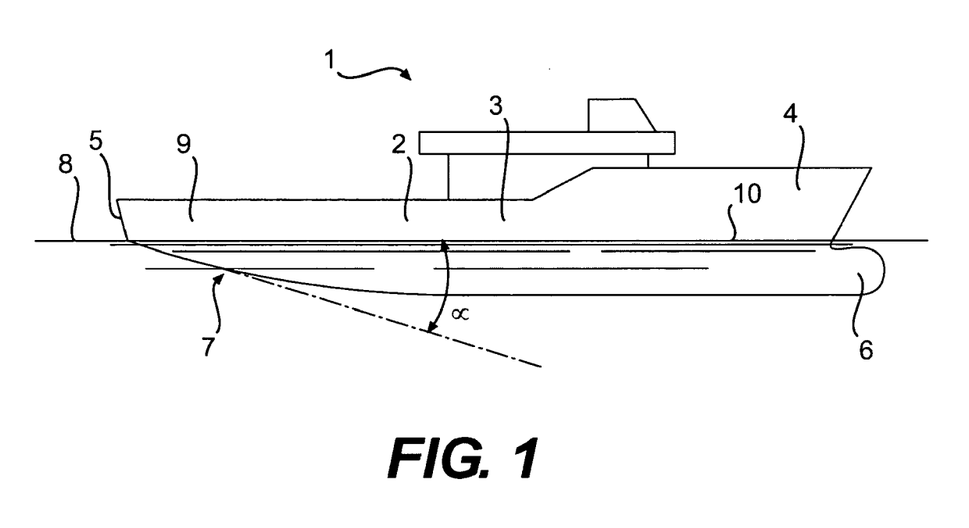
FIG. 1 schematically depicts a vessel not provided with the means according to the present invention.

In FIG. 1, reference numeral 1 denotes a conventional vessel in its entirety, provided with a hull 2 having a central or middle portion 3. Reference numeral 4 denotes the forward hull portion with a bulbous bow extension denoted by 6. In proximity to the aft hull portion of the vessel, denoted by 9, up to the stern 5 is located a low pressure region 7 which in addition to frictional drag, generates further hydrodynamic resistance.

Although not shown in FIG. 1, the transom at the stern or aft end 5 of the vessel sometimes projects above the waterline 10, such as in some sailing vessels and merchant ships. Also, the average angle $\alpha$ of the bottom of the aft hull portion 9, with respect to the horizontal which for zero vessel velocity in calm conditions would essentially be the water surface (depicted as 8), is depicted in FIG. 1.

In accordance with an aspect of the present invention, the vessel for operating on a body of water includes a non-planing hull with a forward portion, an aft portion, and a central portion, where the hull is configured to have the aft portion with a smaller water displacement relative to the central portion. A foil is positioned proximate the end of the aft hull portion, below the surface of the water and spaced from the hull, the foil having a length in the longitudinal direction and a leading edge and a trailing edge. The foil has a profile in longitudinal cross-section with a configuration to provide a lifting force, and the foil is oriented to provide a forwardly directed component of the lifting force.

Figure 2A:
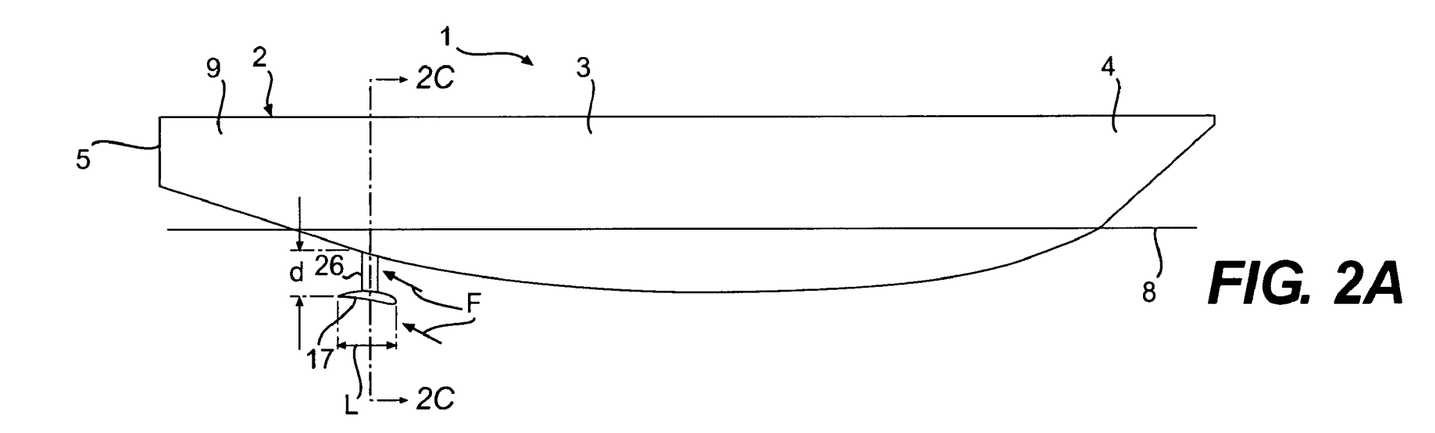
FIG. 2A shows in side view a vessel according to the present invention.
Figure 2B:
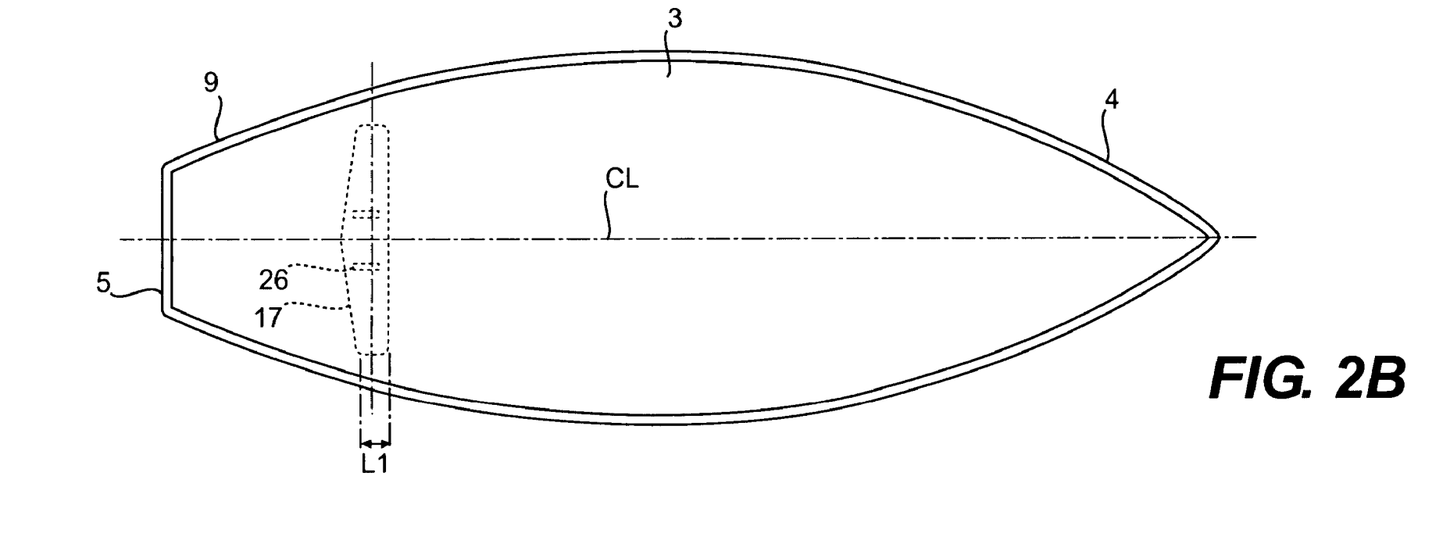
FIG. 2B shows the vessel according to FIG. 2A in top view.
Figure 2C:
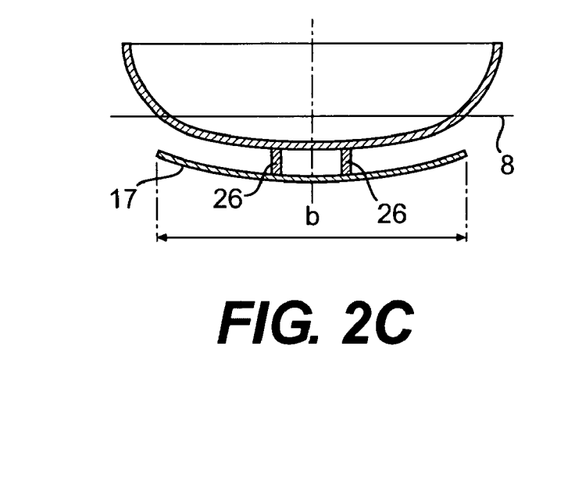
FIG. 2C shows the vessel according to FIG. 2A in rear view.

As embodied herein, and with initial reference to FIGS. 2A-2C, vessel 1 includes hull 2 with central portion 3, forward portion 4, and aft portion 9, having an aft end 5. Vessel 1, which is a sailing vessel-type as compared to the freight vessel-type shown in FIG. 1, is shown on surface 8 of a body of water, at conditions of zero hull velocity in the forward direction. The portion of the line representing water surface 8 on hull 2 also represents the waterline of vessel 1, as used in the subsequent discussion.

A foil 17 is fitted under vessel 1 below the water surface 8. Foil 17 is fixed in an immovable manner on the vessel by means of one or more supports 26. The distance between foil 17 and the hull 2 in the FIG. 2A embodiment is constant and is designated d. The length a of the foil at the position of the axis denoted CL (FIG. 2B) is preferably approximately equal to the distance d. The length a of the foil decreases from the longitudinal centerline axis CL to the sides of the vessel, as can be seen from FIG. 2B. The longest length is indicated by L in FIG. 2A, while the shortest length is indicated by $L_1$ in FIG. 2B. This reduction of the length is obtained owing to the fact that the rear side of the foil tapers. The breadth b of the foil (FIG. 2C) is preferably at least three times, and more particularly at least four times, the length L of said foil.

As can be seen from FIG. 2A, the profile of foil 17 is of such a shape that it causes a lifting force to be produced by the local flow rate at that point (depicted schematically by arrows F). Owing to the fact that the local flow is directed obliquely upwards (and backwards), this lifting force is not directed purely vertically, but slightly forward. The resultant arising from this has a component in the forward direction.

Foil 17 can be made of any material known in the art. This material depends on the application. For competition boats it will be a light material, such as a material impregnated with carbon fibers. In the case of freight ships the material used will be steel or aluminum. A reduction in resistance of over 7% was found during model experiments on a container vessel. After correcting for scale effects, this reduction should amount to a 13% reduction for a full-size vessel.

Figure 3A:
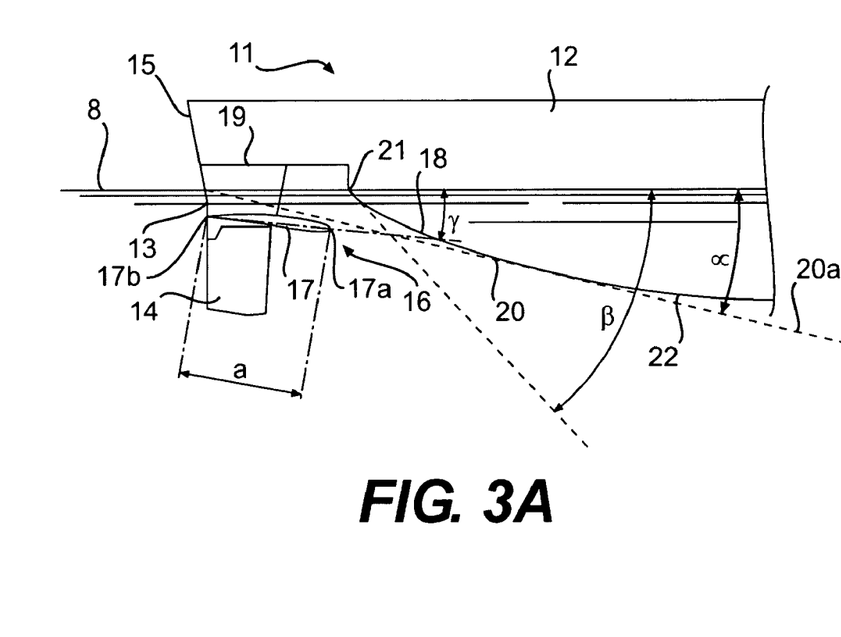
FIG. 3A shows a portion of a vessel comprising a further embodiment of the present invention, suitable for newly-built ships.
Figure 3B:
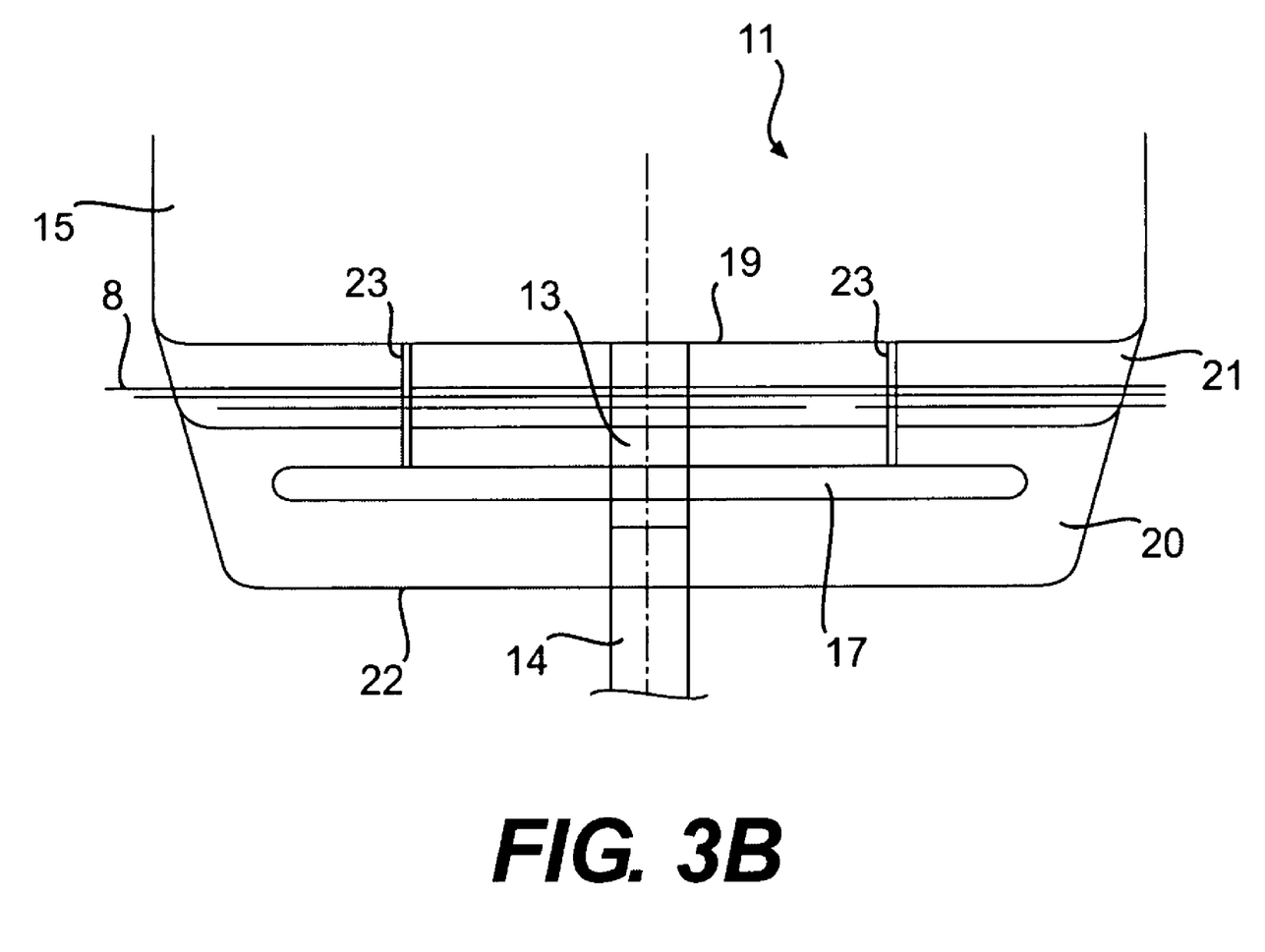
FIG. 3B is a rear view of the embodiment of FIG. 3A.

Another embodiment of the invention is shown in FIGS. 3A-3C, in which the vessel as a whole is denoted by 11, the hull by 12, an a foil 17 is attached below hull 12. Foil 17 has a chord length a which is about 2% to 10%, preferably about 2% to 4%, of the total length of vessel 11 at the waterline. The trailing end 17b of foil 17 is approximately even with the vertical tangent to the stern or transom 15. As may be seen from the drawing, hull 12 is provided at the site of foil 17 with a recess 16. Recess 16 includes a portion 18 with greater steepness, relative to the inclination of the bottom of the aft hull portion distant the recess (i.e., location 20 in FIG. 3A), and a free portion 19 above the surface of the water 8. The portion 18 forward of foil leading edge 17a is steeper than the usual approximately 8° to 16° in, for instance, merchant ships. It was found that an inclination or "rising" angle β of about 11° to about 25° has an advantageous effect.

The total length of the steeper portion 18 is from about 1.0 to about 1.5 times the total chord length of foil 17 in front of the leading edge 17a of foil 17. Foil 17 is positioned about 0.5 times the chord length of the foil 17 in front, up to about 0.75 times the chord of the foil 17 behind, the point where the water surface releases the hull (location 21, in FIG. 3A). The free part of step 19 will in general have a height of about 0.25 to about 0.75 times the chord length of the foil 17 above the water surface. The leading edge 17a of the foil 17 will be directed with a downward tilt with respect to the horizontal (water surface 8 in FIG. 3A) for the best result.

In the embodiment shown in FIGS. 3A-3C, foil 17 is fastened to the headbox 13 of rudder 14. The foil 17 is at an angle γ with respect to the horizontal (~water surface 8), and this angle γ is greater than 0° to about 22°. The tangent line to the hull 12 at location 20 distant recess 16, is denoted by 20a. The line 20a is at an angle α of from 8° to 16° with respect to the horizontal.

The construction shown in FIGS. 3A-3C is particularly practicable in the case of newly-built ships. The recess 16 may be formed at little additional cost. The position of the foil is such that there is little or no risk of damage during maneuvering (e.g. docking). Moreover, it has been found that a construction of this type does not negatively affect the tonnage of the vessel because technical installations, which may easily be regrouped, are usually present in the aft portion of the vessel. The construction shown in this case allows fuel consumption to be reduced by about 20% maximum. This means that in the case of relatively large vessels, in particular, i.e. vessels having a length of more than 50 meters, the cost recovery period is less than one year.

In FIG. 3B, a rear view of vessel 11 which depicts foil 17 being mounted to the fixed part (headbox) of rudder 14 and has been provided with additional streamlined struts 23, for strength.

Figure 4A:
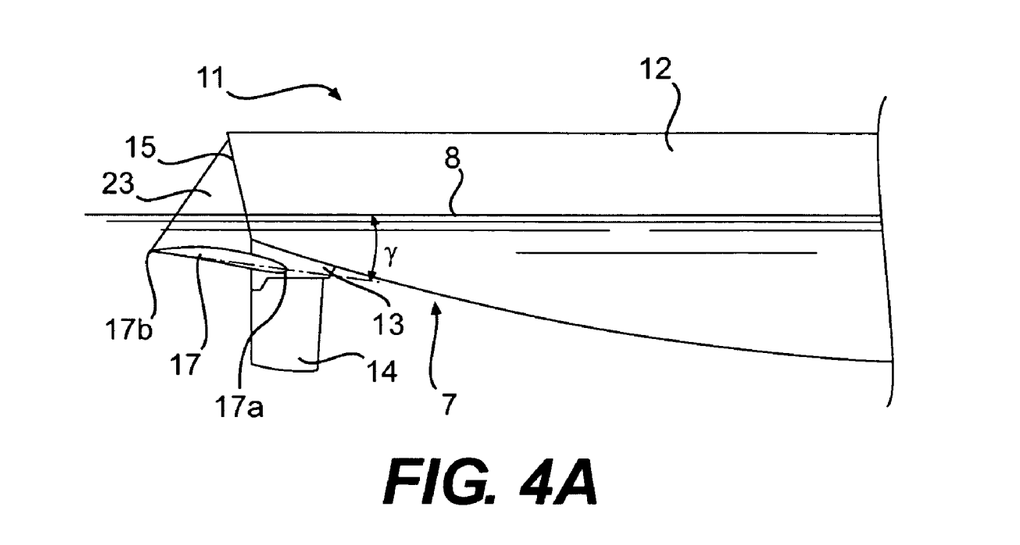
FIG. 4A depicts an improved variation of the construction shown in FIGS. 2A and 2B, particularly suited for construction on both existing and newly-built ships.

FIG. 4A depicts an embodiment similar to FIG. 2A but with improved performance characteristics relative thereto. In FIG. 4A, the hull of the vessel denoted by 12 includes a stern or transom 15 that extends to the water surface 8. The foil is denoted by 17 and extends only partly below the hull, in proximity to the stern 15, the remainder being outside (rearward of) the vessel, i.e. beyond the stern 15. Reference numeral 23 denotes a streamlined strut with which foil 17 is fastened to the vessel. In this embodiment, the angle between the chord of foil 17 and the horizontal (again represented by water surface 8 in non-moving calm conditions) is between greater than 0° and about 12°. The length of the chord of the foil, as in the preceding example, is from approximately 2% to 10% of the length of the hull at the waterline. The leading edge 17a of foil 17 is preferably positioned less than or equal to 0.5 times the chord length of foil 17 behind the location where hull 12 leaves the water, in this case, along transom 15. The rear 17b of the foil is preferably located below the water surface 8 by a depth of from 0 to 0.75 times the length of the chord of foil 17.

The variation depicted in FIG. 4A may not only be applied to new constructions but also subsequently to existing vessels. In this case, too, a substantial propelling force is obtained and the low pressure region 7 at the relevant part of the aft hull portion is largely eliminated.

Figure 4B:
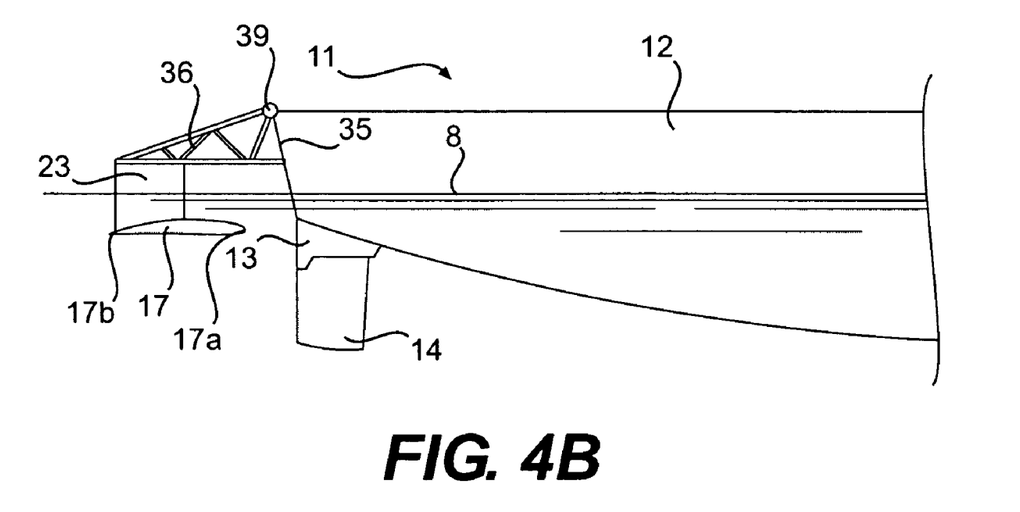
FIG. 4B depicts an alternative improved variation of the construction in FIG. 2A.

FIG. 4B shows an alternative variation which also is particularly suitable for subsequent application to existing ships. For this purpose, a support 36, to which foil 17 is fastened, is attached to the stern 35. This foil 17 extends entirely outside the vertical projection of vessel 11. The length of the foil preferably corresponds to the above-mentioned values, i.e. from about 2% to about 10% of the length of the hull at the waterline of the ship, depending on the size of the ship. The distance between leading edge 17a of the foil and the stern 35 of the vessel is about equal to the length of the chord of foil 17. The depth with respect to the surface of the water 8 at trailing edge 17b of the foil is approximately 0 to 0.5 times the length of the chord of the foil. In contrast to the earlier examples, the foil preferably has less downward tilt with respect to the horizontal, i.e. the chord of foil 17 is at a downward tilt angle γ of from greater than 0° to about 6°.

In order to obtain the beneficial effect in the embodiment of FIG. 4B, in general, the chord of the foil will be at a slightly upward angle with respect to the local flow of the water below the hull, in such a way that the peak of the wave which is normally created in the region aft of the stern during operation (i.e., forward movement of hull 12) will be lowered. In that case, the resistance will be lowered, as the foil 17 causes lift with a forwardly directed force component. The exact tilt angle of the foil 17 with respect to the horizontal (i.e., surface of water at zero hull velocity) depends, amongst other, on the flow behind the hull. In this embodiment, the tilt angle of the chord can even be adjustable for obtaining the most optimal effect during service.

Also, in the FIGS. 4A and 4B embodiments, the supports 23 or supports 23 plus frame 36 (FIG. 4B) can be liftable to up or above the hull in order to reduce the overall length of the vessel, for instance in a harbor. To that extent, the supports 23 or frame 36 can be provided with a hinge 39, such as shown in FIG. 4B, to pivot the assembly of foil 17, supports 23, and frame 36 up and onto the deck. If necessary, a lock, for instance to the stern 15 or 35, could be provided.

Figure 5A:
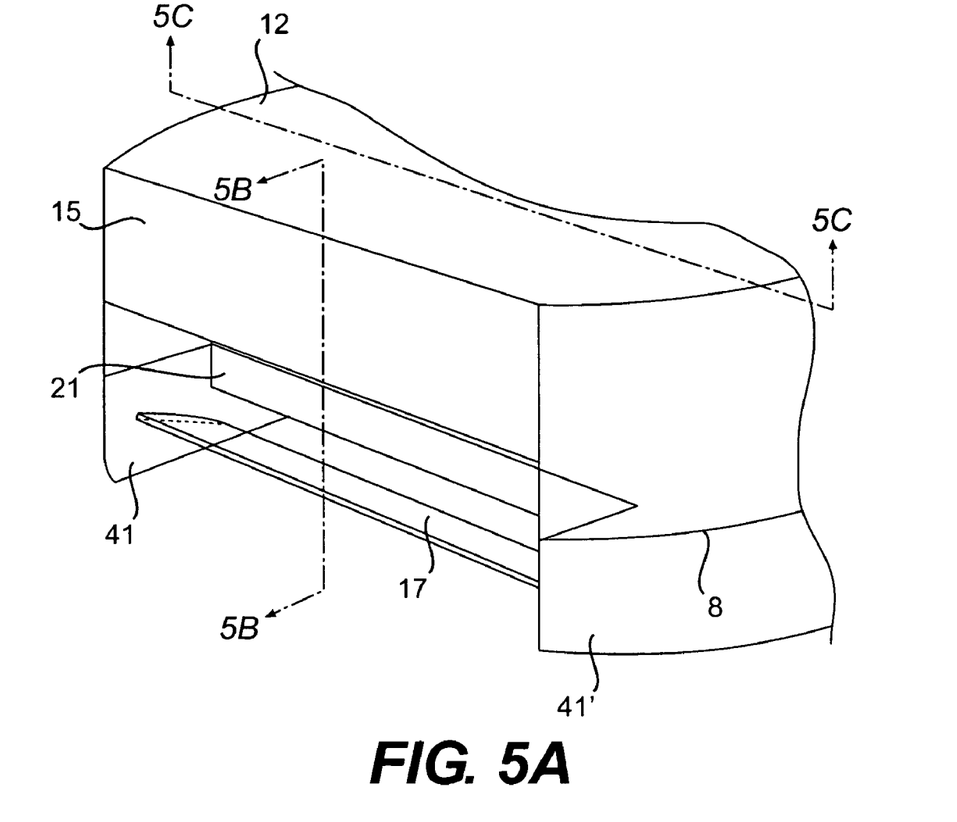
FIG. 5A shows a still further embodiment in which sponsons are used, in perspective view from the rear.
Figure 5B:
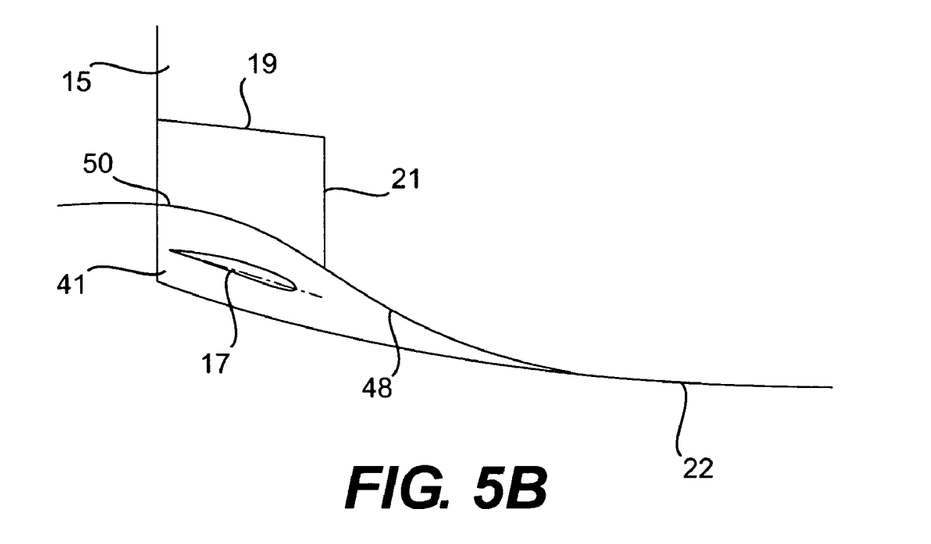
FIG. 5B is a side view of the embodiment of FIG. 5A.
Figure 5C:
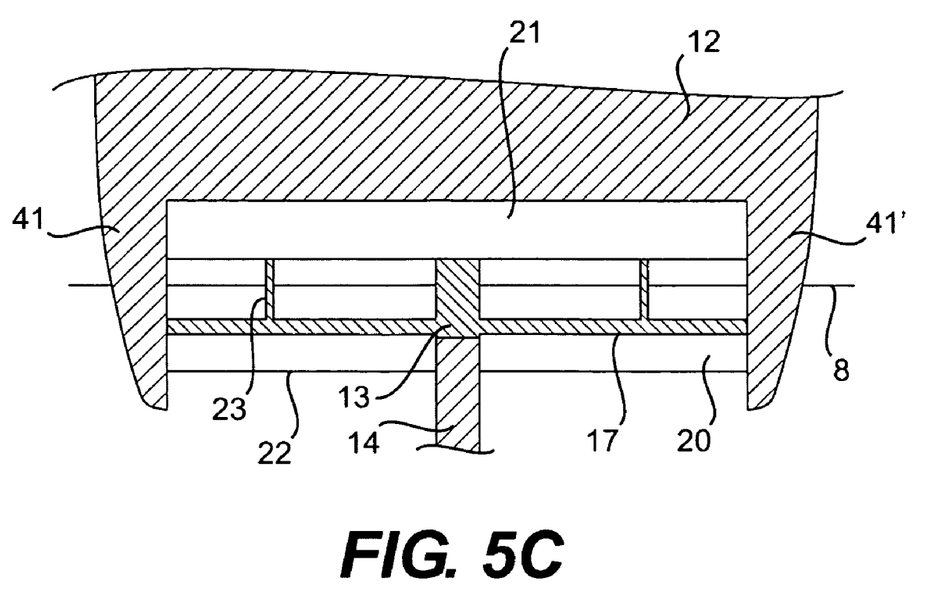
FIG. 5C is a rear view of the embodiment of FIG. 5A.

In FIGS. 5A-5C an embodiment of the invention is shown, in which the stern of the ship is provided with sponsons 41, 41' at the rear of the ship, particularly of interest for newly built ships. Between the sponsons the hull can rise steeply and/or be provided with a recess as shown in FIG. 3A. Preferably, the hull between the sponsons has a cross-section as shown and described with respect to FIG. 3A.

In FIG. 5A a perspective view from behind is shown, which shows in a schematic way such a vessel. Foil 17 can be mounted on and between sponsons 41, 41', as shown. In FIG. 5B, a longitudinal cross-section of such a vessel, the position of foil 17 is depicted with leading edge 17a behind the location where the hull would leave the water (at zero hull velocity), generally somewhere along hull bottom surface 48 or recess wall 21, depending on ship loading. Also, the "dynamic" waterline of the vessel during operation (forward movement) is depicted at 50 in FIG. 5B, showing an upward and rearward local flow in the vicinity of foil 17. FIG. 5C is a transverse cross-section and depicts possible mounting features including one or more struts 23, and rudder headbox 13.

Figure 6:
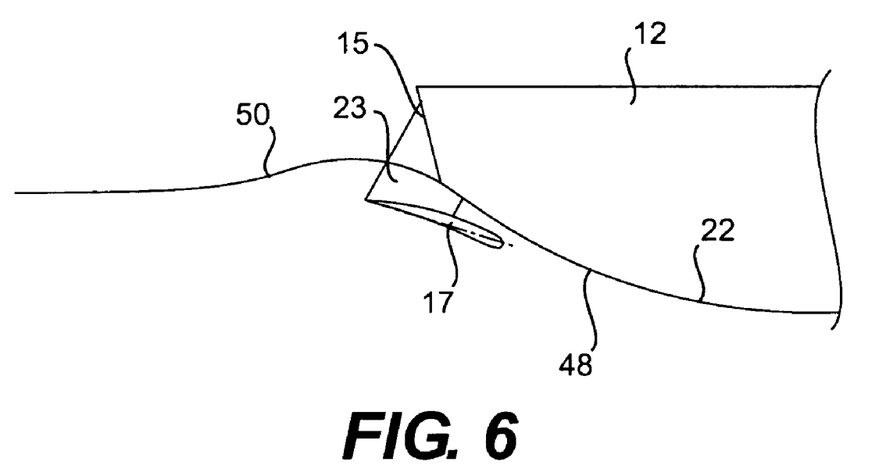
FIG. 6 depicts an embodiment in which the hull bottom rises relatively steeply, which can occur particularly in full ships.

FIG. 6 depicts a further embodiment of the invention for some existing ships such as a slow speed dredger or oil tanker fully loaded or for new ships, in which the aft end of the ship has a steeply rising bottom. Without foil 17 separation of the flow may occur. By proper placement of foil 17, the flow will not separate and keeps following the bottom of the hull. The trailing edge of the foil is here positioned up to 50% of the chord length below the hull and the leading edge relatively much closer (with respect to earlier shown embodiments).

It will be clear from the foregoing examples that various variations are possible within the scope of the concept of the invention. In addition, a person skilled in the art will understand that further modifications are possible within the scope of the inventive concept as set out above. Protection is explicitly sought for these variations, modifications, and all further embodiments thereof within the scope of the appended claims.

What is claimed:

1. A vessel for operating on a body of water comprising:
   a non-planing hull having a waterline and a longitudinal direction with a forward portion, an aft portion, and a central portion, the hull configured to have the aft portion with a smaller water displacement relative to a water displacement at the central portion; and
   a foil affixed to the aft hull portion, and below the surface of the water, and spaced from the hull, the foil having a chord, and a leading edge and a trailing edge relative to a forward direction,
   wherein the leading edge of the foil is tilted at a downward angle relative to the horizontal,
   wherein at least half the chord of the foil is behind a vertical line through the location where the aft portion of the hull leaves the water,
   wherein the foil has a chord and profile in longitudinal cross section, with a configuration to provide a lifting force, the tilt angle of the chord of the foil being measured with respect to the horizontal, and
   wherein the foil is oriented to provide a continuous, upward, forwardly directed component of the lifting force.

2. The vessel as in claim 1, having a Froude number less than 0.5.

3. The vessel as in claim 1, wherein the tilt angle is greater than zero and less than or equal to about 22°.

4. The vessel as in claim 1, wherein the spacing between the foil leading edge and the hull is greater than 0.1 times the length of the chord.

5. The vessel as in claim 4, wherein the spacing between the foil leading edge and the hull is in the range of from 0.25 to 0.5 times the length of the chord.

6. The vessel as in claim 1, wherein the chord length is in the range of from 2% to 10% of a longitudinal length of the hull at the waterline.

7. The vessel as in claim 1 further comprising a recess formed in the aft hull portion extending forwardly from the aft end, wherein the location where the aft hull portion leaves the water is located within a vertical projection of the recess, and wherein the foil is positioned at least partially within a vertical projection of the recess.

8. The vessel as in claim 7, wherein the foil is located entirely within the vertical projection of the recess.

9. The vessel as in claim 7, wherein the hull has a sponson located at each side of the hull at the aft portion, each sponson defining at least a side part of the recess and extending vertically beneath the surface of the water, wherein the foil is mounted to, and between, the sponsons beneath the surface of the water.

10. The vessel as in claim 7, wherein the foil is positioned with the leading edge being in the range of from 0.5 times to 0.75 times the chord length behind the location where the aft hull portion leaves the water, in the longitudinal direction.

11. The vessel as in claim 1, wherein a bottom surface of the aft hull portion in a region proximate the aft end is inclined relative to the bottom surface of the aft hull portion distant the aft end, and wherein the angle between the horizontal and the tangent to the hull in the inclined region taken in a vertical plane at the longitudinal position of the foil leading edge is in the range of from 11° to 25°.

12. The vessel as in claim 11, wherein the inclined proximate bottom surface extends between 0.5 and 1.5 times the chord length ahead of the foil leading edge position in the longitudinal direction.

13. The vessel as in claim 7, wherein the recess has a hull portion positioned free of the surface of the water, wherein the vertical spacing of the free hull portion above the surface of the water is in the range of from 0.25 to 0.75 times the chord length.

14. The vessel as in claim 1, wherein a part of the foil including the leading edge extends beneath the aft hull portion forward of the longitudinal location where the aft hull portion leaves the surface of the water, wherein the angle between the horizontal and the tangent to the hull at the location where the aft hull portion leaves the water taken in a vertical plane is in the range of from 8° to 16°, and wherein the tilt angle of the foil is less than or equal to 12°.

15. The vessel as in claim 14, wherein the trailing edge of the foil is positioned at a depth below the waterline in the range of from zero to 0.75 times the chord length.

16. The vessel as in claim 1, wherein no part of the foil extends under the aft hull portion forward of the longitudinal location where the aft hull portion leaves the surface of the water, wherein the angle between the horizontal and the tangent to the hull at the location where the aft hull portion leaves the water taken in a vertical plane is in the range from 8° to 16° and wherein the tilt angle of the foil is less than or equal to 6°.

17. The vessel as in claim 16, wherein the leading edge of the foil is positioned rearwardly from the aft end of the hull a distance of about 1.0 times the chord length, and wherein the trailing edge of the foil is positioned at a depth below the waterline in the range of from zero to 0.5 times the chord length.

18. The vessel as in claim 7, wherein the recess has a bottom surface that is inclined relative to the angle of a bottom surface of the aft hull portion distant the recess, and wherein the angle between the horizontal and a tangent to the hull at the forward-most point of the bottom surface of the recess taken in a vertical plane is in the range from 8° to 16°.

19. The vessel as in claim 1, wherein the tilt angle of the foil is adjustable.

20. The vessel as in claim 1 having a support for mounting the foil to the vessel, wherein the support with the mounted foil is selectively movable with respect to the hull.

21. The vessel in claim 1, wherein the spacing between the foil leading edge and the hull is greater than or equal to 0.25 times the length of the chord.

22. The vessel as in claim 1, wherein the hull is configured for sailing, and wherein the spacing between the foil and the hull is approximately equal to the length of the foil.

23. A vessel for operating on a body of water comprising:
a non-planing hull having a waterline and a longitudinal direction with a forward portion, an aft portion, and a central portion, the hull configured to have the aft portion with a smaller water displacement relative to a water displacement of the central portion; and
a foil affixed to the aft hull portion, and below the surface of the water and spaced from the hull, the foil having a chord, and a leading edge and a trailing edge relative to a forward direction,
wherein the chord of the foil is tilted at a downward angle relative to the horizontal, which downward angle is greater than zero degrees and less than or equal to 22°,
wherein at least half the chord of the foil is behind a vertical line through the location where the aft portion of the hull leaves the water,
wherein the foil has a profile in longitudinal cross section with a configuration to provide a lifting force, the tilt angle of the foil being measured with respect to the chord,
wherein the chord length is in the range of from 2% to 10% of the longitudinal length of the hull at the waterline, and
wherein the foil is oriented to provide a continuous, upward, forwardly directed component of the lifting force.

24. The vessel as in claim 23, wherein the spacing between the foil leading edge and the hull is greater than or equal to 0.25 times the length of the chord.

25. The vessel as in claim 24, wherein the spacing between the foil leading edge and the hull is less than or equal to 0.50 times the length of the chord.

26. A vessel for operating on a body of water comprising:
a non-planing hull having a waterline and a longitudinal direction with a forward portion, an aft portion, and a central portion, the hull configured to have the aft portion with a smaller water displacement relative to a water displacement at the central portion; and
a foil affixed to the aft hull portion, and below the surface of the water, and spaced from the hull, the foil having a chord, and a leading edge and a trailing edge relative to a forward direction,
a recess formed in the aft hull portion extending forwardly from the aft end, wherein the location where the aft hull portion leaves the water is located within a vertical projection of the recess, and wherein the foil is positioned at least partially within a vertical projection of the recess;
wherein the leading edge of the foil is tilted at a downward angle relative to the horizontal,
wherein at least half the chord of the foil is behind a vertical line through the location where the aft portion of the hull leaves the water,
wherein the foil has a chord and profile in longitudinal cross section, with a configuration to provide a lifting force, the tilt angle of the chord of the foil being measured with respect to the horizontal, and
wherein the foil is oriented to provide a continuous, upward, forwardly directed component of the lifting force.

* * * * *